(12) United States Patent
Modha

(10) Patent No.: US 7,058,766 B2
(45) Date of Patent: Jun. 6, 2006

(54) METHOD AND SYSTEM OF ADAPTIVE REPLACEMENT CACHE WITH TEMPORAL FILTERING

(75) Inventor: Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 10/690,303

(22) Filed: Oct. 21, 2003

(65) Prior Publication Data

US 2005/0086436 A1 Apr. 21, 2005

(51) Int. Cl.
*G06F 12/00* (2006.01)

(52) U.S. Cl. ............... 711/134; 711/134; 711/133; 711/118; 711/122

(58) Field of Classification Search .......... 711/133, 711/134
See application file for complete search history.

(56) References Cited

U.S. PATENT DOCUMENTS

| 4,463,424 | A | * | 7/1984 | Mattson et al. | 711/136 |
|---|---|---|---|---|---|
| 4,802,086 | A | * | 1/1989 | Gay et al. | 711/133 |
| 5,649,156 | A | | 7/1997 | Vishlitzky et al. | |
| 6,078,995 | A | | 6/2000 | Bewick et al. | |
| 6,378,043 | B1 | * | 4/2002 | Girkar et al. | 711/133 |
| 6,631,446 | B1 | * | 10/2003 | Cherkauer et al. | 711/134 |
| 6,738,866 | B1 | * | 5/2004 | Ting | 711/133 |
| 6,745,295 | B1 | * | 6/2004 | Rodriguez | 711/136 |
| 6,748,491 | B1 | * | 6/2004 | Rodriguez | 711/122 |
| 6,775,745 | B1 | * | 8/2004 | Fry et al. | 711/134 |
| 2003/0105926 | A1 | | 6/2003 | Rodriguez | |
| 2004/0098541 | A1 | * | 5/2004 | Megiddo et al. | 711/129 |

OTHER PUBLICATIONS

Improving Disk Cache Hit-Ratios Through Cache Partitioning, Dominique et al. IEEE Log No. 9105059. Jan. 12, 1990.*
LRU-SP: A size-Adjusted and Popularity-Aware LRU Replacement Algorithm for Web Caching, Kai et al. Graduate school of Informatics, Kyoto University. 0-7695-0792-1/00 copy right 2000 IEEE.*

(Continued)

*Primary Examiner*—Mano Padmanabhan
*Assistant Examiner*—Kaushikkumar Patel
(74) *Attorney, Agent, or Firm*—Gibb I.P. Law Firm, LLC; Mark C. McCabe, Esq.

(57) ABSTRACT

A method for adaptively managing pages in a cache memory with a variable workload comprises defining a cache memory; organizing the cache into disjoint lists of pages, wherein the lists comprise lists $T_1$, $T_2$, $B_1$, and $B_2$; maintaining a bit that is set to either "S" or "L" for every page in the cache, which indicates whether the bit has short-term utility or long-term utility; ensuring that each member page of $T_1$ is marked either as "S" or "L", wherein each member page of $T_1$ and $B_1$ is marked as "S" and each member page of $T_2$ and $B_2$ is marked as "L"; and maintaining a temporal locality window parameter such that pages that are re-requested within a window are of short-term utility and pages that are re-requested outside the window are of long-term utility, wherein the cache comprises pages that are members of any of lists $T_1$ and $T_2$.

30 Claims, 6 Drawing Sheets

OTHER PUBLICATIONS

Reducing Cache Conflicts by Multi-level Cache Partitioning and Array Elements Mapping. Chih-Yung Chang, Dept. of Computer and Information Science, Aletheia University, 0-7695-0566-6/00 IEEE.*

LRFU: A Spectrum of Policies that Subsumes the Least Recently Used and Least Frequently Used Policies, Donghee Lee et al. Mar. 10, 2000. IEEECS Log No. 111694.*

ARC: A Self-Tuning,Low Overhead Replacement Cache, Megiddo et al. USENIX File & Storage Technologies Conference (FAST), Mar. 31, 2003.*

* cited by examiner

METHOD AND SYSTEM OF ADAPTIVE REPLACEMENT CACHE WITH TEMPORAL FILTERING

BACKGROUND OF THE INVENTION

1. Field of the Invention

The present invention generally relates to cache operations within computer systems, and more particularly to an adaptive cache replacement technique with enhanced temporal filtering in a demand paging environment.

2. Description of the Related Art

Caching is a fundamental problem in computer science. Modem computational infrastructure designs are rich in examples of memory hierarchies where a fast, but expensive main ("cache") memory is placed in front of an inexpensive, but slow auxiliary memory. Caching algorithms manage the contents of the cache so as to improve the overall performance. In particular, cache algorithms are of tremendous interest in databases, virtual memory management, and storage systems, etc., where the cache is RAM and the auxiliary memory is a disk subsystem.

For simplicity, it is assumed that both the cache and the auxiliary memory are managed in discrete, uniformly-sized units called "pages". If a requested page is present in the cache, then it can be served quickly resulting in a "cache hit". On the other hand, if a requested page is not present in the cache, then it must be retrieved from the auxiliary memory resulting in a "cache miss". Usually, latency on a cache miss is significantly higher than that on a cache hit. Hence, caching algorithms focus on improving the hit ratio. Historically, the assumption of "demand paging" has been used to study cache algorithms. Under demand paging, a page is retrieved from the auxiliary memory to the cache only on a cache miss. In other words, demand paging precludes speculatively pre-fetching pages. Under demand paging, the only question of interest is: When the cache is full, and a new page must be inserted in the cache, which page should be replaced?

Digital microprocessors use cache memory to hold data likely to be needed in the near future. Cache memory is comparatively fast and is a local memory. Caching usually occurs when data or other instructions are retrieved from the main memory to be used by the microprocessor, they are also stored in the cache. Typically, the cache is constructed from a random access, read/write memory block (RAM), which can access a single stored object, referred to a line, in a single processor cycle. Preferably, the cache size matches the processor cycle time and is read or written during a given cycle. A server can be configured to receive a stream of requests from clients in a network system to read from or write to a disk drive in the server. These requests form the "workload" for the server.

Figure 1:
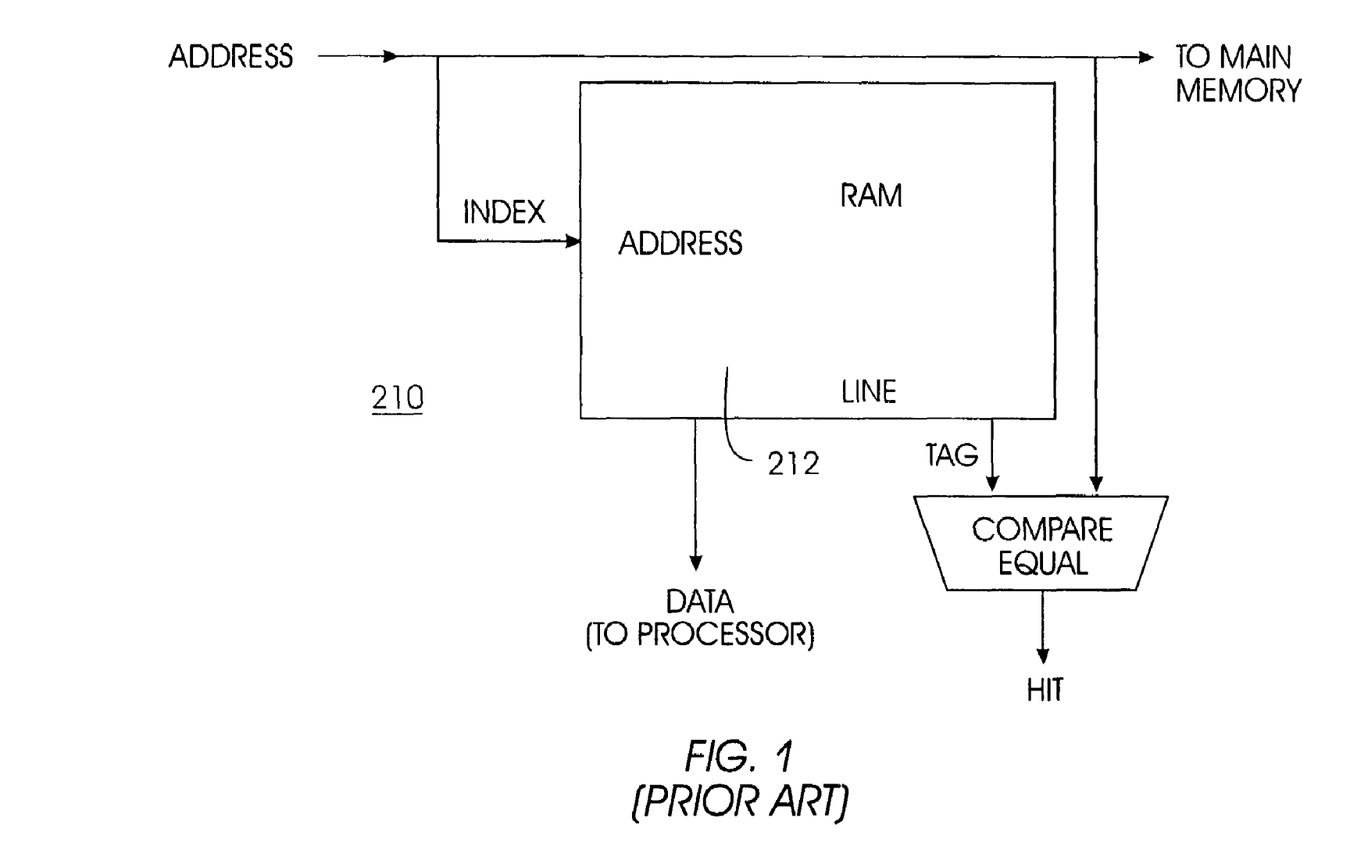
FIG. 1 is a block diagram of a conventional cache memory system.

Each line in the cache memory contains the data being saved and the address of the data in the main memory (the tag). An example of a simple cache 210 is illustrated in the block diagram of FIG. 1. When the microprocessor makes a reference to the main memory, a part of the reference address, referred to as the index, accesses a single line stored in the cache RAM 212. A "hit" occurs if the tag of the accessed line in the cache 210 matches the reference address of the referenced data. When this happens the cache RAM 212 immediately supplies the line to the microprocessor. However, a "miss" occurs if the tag of the accessed line in the cache 210 does not match the reference address of the referenced data. When this happens the address is sent to the main memory to retrieve the requested line. When the main memory sends the line to the microprocessor, it is written into the cache RAM 212 using the same index as the original look-up, along with its tag. However, because the main memory is much slower than the microprocessor, a delay occurs during this retrieval process.

Additionally, cache memory is used when data is written from a host computer to a long-term data storage device such as a disk drive. Here, data may be written to cache memory in which it is temporarily held with an indication that the data must be written to longer term data storage when the data storage system is able to perform this write operation. When cache memory is used to temporarily delay write pending data, memory storage locations are removed from the main memory locations generally available to the data storage system in which data may be held pending use by the host.

Traditionally, under the assumption of demand paging, a cache technique termed the least recently used (LRU) has been used. When the cache is full, and a page must be demoted to make space for a new page, LRU removes the least recently used page from the cache. The technique LRU is simple to implement, has low space and time overhead, and it captures "clustered locality of reference" or "recency" property of workloads. However, LRU has two main disadvantages: (i) it does not capture pages with "high frequency" or "long-term-utility" and (ii) it is not resistant to scans which are a sequence of one-time-use-only read/write requests.

Recently, under the assumption of demand paging, a cache technique termed the Adaptive Replacement Cache (ARC) has been used (Nimrod Megiddo and D. S. Modha, ARC: A Self-tuning, Low Overhead Replacement Cache, Proc. 2nd USENIX Conference on File and Storage Technologies (FAST 03), San Francisco, Calif., 115–130, 2003), the complete disclosure of which is herein incorporated by reference. Comparatively, this caching technique has low computational overhead similar to LRU updating schemes, its space overhead over LRU is negligible, it outperforms LRU for a wide range of workloads and cache sizes, it is self-tuning in that for every workload it dynamically adapts between recency and frequency to increase the hit ratio, and it is scan-resistant, and, hence, avoids cache pollution due to sequential workloads.

The basic idea behind ARC is that the cache is managed in uniform-sized chunks called "pages". Assuming that the cache can hold c pages, the technique ARC maintains a cache directory that contains 2c pages—c pages in the cache and c history pages. The cache directory of ARC, which is referred to as DBL (database load), maintains two lists: $L_1$ and $L_2$. The first list contains pages that have been seen only once recently, while the latter contains pages that have been seen at least twice recently. The replacement technique for managing DBL is: Replace the LRU page in $L_1$, if $|L_1|=c$; otherwise, replace the LRU page in $L_2$. The ARC technique builds on DBL by carefully selecting c pages from the 2c pages in DBL. The basic idea is to divide $L_1$ into top $T_1$ and bottom $B_1$ and to divide $L_2$ into top $T_2$ and bottom $B_2$. The pages in $T_1$ (resp. $T_2$) are more recent than those in $B_1$. (resp. $B_2$). The algorithm sets a target size p for the list $T_1$. The replacement technique is as follows: Replace the LRU page in $T_1$, if $|T_1| \geq p$; otherwise, replace the LRU page in $T_2$. The adaptation comes from the fact that the target size p is continuously varied in response to an observed workload. The adaptation rule is as follows: Increase p, if a hit in the history $B_1$ is observed; similarly, decrease p, if a hit in the history $B_1$ is observed.

However, a limitation of ARC is that whenever it observes a hit on a page in $L_1=T_1 \cup B_1$, it immediately promotes the page to $L_2=T_2 \cup B_2$ because the page has now been recently seen twice. At upper level of memory hierarchy, ARC observes two or more successive references to the same page fairly quickly. Such quick successive hits are known as "correlated references" and are not a guarantee of long-term utility of a page, and, hence, such pages pollute $L_2$, thus reducing system performance. Therefore, there is a need to create a temporal filter that imposes a more stringent test for promotion from $L_1$ to $L_2$. Such a temporal filter is of extreme importance in upper levels of memory hierarchy such as file systems, virtual memory, databases, etc.

The below-referenced U.S. patents disclose embodiments that were satisfactory for the purposes for which they were intended. The disclosures of the below-referenced prior U.S. patents, in their entireties, are hereby expressly incorporated by reference into the present invention for purposes including, but not limited to, indicating the background of the present invention and illustrating the state of the art.

U.S. Pat. No. 5,649,156 issued to Vishlitzky et al. discloses a caching method, which determines whether data should be maintained in short term cache depending on how often it has been accessed. U.S. Pat. No. 6,078,995 issued to Bewick et al. discloses a cache memory system, which uses bits to store whether data has been recently accessed. U.S. patent Publication No. 2003/0105926 discloses a cache memory system which handles/adapts to a variable workload. However, as mentioned a novel adaptive cache replacement technique is needed having enhanced temporal filtering capabilities.

SUMMARY OF THE INVENTION

The invention provides a method, system, and program storage medium for adaptively managing pages in a cache memory with a variable workload, wherein the method comprises maintaining a bit that is set to either a first identifier or a second identifier for every page in the cache memory to indicate whether the bit has short-term utility or long-term utility; and adaptively varying a proportion of pages marked as the short-term utility and those marked as the long-term utility to increase a cache hit ratio of the cache memory. The method further comprises maintaining a temporal locality window such that pages that are re-requested within the window are of short-term utility and pages that are re-requested outside the window are of long-term utility.

Alternatively, the invention provides a method of adaptively managing pages in a cache memory with a variable workload comprising defining a cache memory; organizing the cache memory into a plurality of disjoint lists of pages, wherein the lists comprise a first list of top pages, a second list of top pages, a first list of bottom pages, a second list of bottom pages; maintaining a bit that is set to either a first identifier or a second identifier for every page in the cache memory to indicate whether the bit has short-term utility or long-term utility; ensuring that each member page of the first list of top pages is marked either as short-term utility or as long-term utility, wherein each member page of the first list of bottom pages is marked as short-term utility and each member page of the second list of top pages and the second list of bottom pages is marked as long-term utility; and maintaining a temporal locality window parameter such that pages that are re-requested within a specified window are of short-term utility and pages that are re-requested outside the window are of long-term utility, wherein the cache memory comprises pages that are members of any of the first list of top pages and the second list of top pages and the cache history comprises pages that are members of any of the first list of bottom pages and second list of bottom pages. The method further comprises adaptively varying sizes of the first list of top pages, the first list of bottom pages, the second list of top pages, and the second list of bottom pages, and adaptively varying the temporal locality window parameter in response to a variable workload.

The first list of top pages and the first list of bottom pages have a variable total length, and the second list of top pages and the second list of bottom pages have a variable total length. Moreover, the step of defining the cache memory comprises defining a cache memory size measured as a number of pages the cache memory can hold. Also, the method further comprises maintaining a total number of pages in the cache memory that are marked as the first identifier to approximately a same size as the cache memory, maintaining a total number of pages in the cache memory that are marked as the second identifier to approximately a same size as the cache memory, labeling each page with bit short-term utility if the page does not exist in either the first list of top pages, the first list of bottom pages, the second list of top pages, or the second list of bottom pages, and changing a label of a page from short-term utility to long-term utility only if the page is in the first list of bottom pages, the pages in each of first list of top pages, the first list of bottom pages, the second list of top pages, and the second list of bottom pages appear in an order according to their respective most recent requests, wherein each list comprises a top page and a bottom page, with the top page listing most recent member pages and the bottom page listing least recent member pages, the bottom page in the first list of top pages is always labeled as short-term utility.

Another embodiment of the invention provides a computer system for adaptively managing pages in a cache memory with a variable workload comprising a cache memory directory comprising a plurality of disjoint lists of pages, wherein the lists comprise list first list of top pages, the first list of bottom pages, the second list of top pages, and the second list of bottom pages; a bit marker that marks each of the pages to either a first identifier or a second identifier in the cache memory directory to indicate whether the page has short-term utility or long-term utility, wherein each member page of the first list of top pages is marked either as short-term utility or as long-term utility, wherein each member page of the first list of bottom pages is marked as short-term utility, and wherein each member page of the second list of top pages and the second list of bottom pages is marked as long-term utility; and a temporal locality window parameter, wherein pages that are re-requested within a specified window parameter are of short-term utility and pages that are re-requested outside the window parameter are of long-term utility, wherein the cache memory directory comprises pages that are members of any of the first list of top pages and the second list of top pages, and the cache history comprises pages that are members of any of the first list of bottom pages and the second list of bottom pages.

The computer system further comprises a controller operable for adaptively varying sizes of the first list of top pages, the first list of bottom pages, the second list of top pages, and the second list of bottom pages, and adaptively varying the temporal locality window parameter in response to a variable workload, wherein the first list of top pages and the first list of bottom pages have a variable total length, and the second list of top pages and the second list of bottom pages have a variable total length, and wherein the cache memory directory comprises a cache memory directory size measured as a number of pages the cache memory directory can hold.

The computer system further comprises a controller operable for maintaining a total number of pages in the cache memory that are marked as short-term utility to approximately a same size as the cache memory. Also, the computer system further comprises a controller operable for maintaining a total number of pages in the cache memory that are marked as long-term utility to approximately a same size as the cache memory. Additionally, the computer system further comprises a controller operable for labeling each page with bit short-term utility if the page does not exist in either the first list of top pages, the first list of bottom pages, the second list of top pages, or the second list of bottom pages. Furthermore, the computer system further comprises a controller operable for changing a label of a page from short-term utility to long-term utility only if the page is in the first list of bottom pages, wherein the pages in each of the first list of top pages, the first list of bottom pages, the second list of top pages, and the second list of bottom pages appear in an order according to their respective most recent requests, wherein each list comprises a top page and a bottom page, with the top page listing most recent member pages and the bottom page listing least recent member pages, the bottom page in the first list of top pages is always labeled as short-term utility.

These and other aspects and advantages of the invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The invention includes a method for creating a new adaptive replacement cache with temporal filtering. The invention is self-tuning in that it dynamically adapts between recency and frequency, has low overhead, is scan resistant, and outperforms LRU for a wide range of workloads and cache sizes. The invention is an improvement to the adaptive replacement cache (ARC) technique for upper levels of memory hierarchy, especially databases, virtual memory, and file systems. The invention acts as a temporal filter to distill pages with long-term utility from those with only short-term utility.

Referring now to the drawings and more particularly to FIGS. 2–5, there are shown preferred embodiments of the invention. The invention is referred to as Adaptive Replacement cache with Temporal filtering (ART). The cache is managed in units of uniformly-sized objects, namely, pages. For example, let c be the cache size in pages. The invention maintains four LRU lists, namely, $T_1$, $T_2$, $B_1$, and $B_2$. The LRU (least recently used) and MRU (most recently used) pages in each of the lists are referred to as the bottom and top pages, respectively. The pages in $T_1$ and $T_2$ will be in the cache and will also be maintained in a cache directory. However, the pages in $B_1$ and $B_2$ will be in the cache directory, but will not be in the cache.

Each page is marked with a bit to indicate whether it has long-term utility ("L") or only short-term utility ("S"). The conventional ARC technique does not utilize this concept of bit marking. The invention provides for the following invariants.

1. $|T_1|+|T_2|\leq c$.
2. $|T_2|+|B_2|\leq c$.
3. $|T_1|+|B_1|\leq 2c$
4. $|T_1|+|B_1|+|T_2|+|B_2|\leq 2c$.
5. If $|T_1|+|T_2|<c$, then $B_1\cup B_2$ is empty.
6. If $|T_1|+|B_1|+|T_2|+|B_2|\geq c$, then $|T_1|+|T_2|=c$.
7. If $|T_1|+|B_1|+|T_2|+|B_2|=2c$, then $|T_1|+|T_2|$ and $|B_1|+|B_2|=c$.
8. For i=1, 2, either $T_i$ or $B_i$ is empty, or LRU page in $T_i$ is more recent than the MRU page in $B_i$.
9. Every page in $T_2$ and $B_2$ must be marked as "L".
10. Every page in $B_1$ must be marked as "S".
11. A page in $T_1$ could be marked as "S" or "L".
12. The LRU page in $T_1$ must be always marked as "S".

In other words, the above invariants provide for the following. The lists $T_1$, $B_1$, $T_2$, and $B_2$ are of variable size, and their sizes can fluctuate continuously. The invariants describe the restrictive conditions on how large these lists could be. The pages in $T_1$ and $T_2$ are in the cache, and the pages in $B_1$ and $B_2$ are in the cache history but not in the cache. Invariant (1) says that at any time the cache can hold at most c pages. That is, the total number of pages in $T_1$ and $T_2$ cannot exceed c. Invariant (2) provides that the total number of pages in $T_2$ and $B_2$ cannot exceed c. Invariant (3) states that the total number of pages in $T_1$ and $B_1$ cannot exceed 2c. Invariant (4) holds that the total number of pages in $T_1$, $B_1$, $T_2$, and $B_2$ cannot exceed 2c. Invariant (5) indicates that if the cache is not yet full, that is, $T_1$ and $T_2$ contain less than c pages, then $B_1$ and $B_2$ must be empty. Invariant (5) is a consequence of the "demand paging" assumption. On the other hand, invariant (6) says that if the total number of pages in $T_1$, $B_1$, $T_2$, and $B_2$ exceeds c, then the cache must be full, that is, $T_1$ and $T_2$ contain exactly c pages. Invariant (7) says that if $T_1$, $B_1$, $T_2$, and $B_2$ contain exactly 2c pages, then the cache is full, that is, $T_1$ and $T_2$ contain exactly c pages and the cache history is full, and $B_1$ and $B_2$ contain exactly c pages. Invariant (8) says that only the LRU page in $T_1$ can be removed, and whenever a page is removed from $T_1$ it is added to the MRU position in $B_1$. Similarly, invariant (8) says that only the LRU page in $T_2$ can be removed, and whenever a page is removed from $T_2$ it is added to the MRU position in $B_2$. Invariants (9)–(12) indicate the marking rules specific the various pages. The invariants as stated above ensure a demand paging environment and define how much cache history will be kept for the lists $B_1$ and $B_2$.

Each page is marked as "S" or "L". This bit is set as follows (x denotes a requested page):
1. If $x \notin T_1 \cup B_1 \cup T_2 \cup B_2$, then set its type to "S".
2. If $x \in T_1$ and $|T_1| \geq |B_1|$ is empty, change its type to "L".
3. If $x \in T_1$ and $|T_1| <= |B_1|$, then leave the type of x unchanged.
4. If $x \in T_2 \cup B_2$, then leave the type of x unchanged.
5. If $x \in B_1$, then x must be of type "S", change its type to "L".

In other words, the above rules provide for the following. Rule (1) says that for a totally new page, that is, a page that is neither in the cache lists $T_1$ and $T_2$ nor in the cache history lists $B_1$ and $B_2$, this new page is marked as being of short-term utility. Rule (2) says that if $T_1$ is at least as large $B_1$ and a cache hit happens in $T_1$, then the page is marked as being of long-term utility. Rule (3) says that if $T_1$ is smaller than $B_1$ and a cache hit happens in $T_1$, then the type of the hit page is left unchanged. Similarly, rule (4) says that if a cache hit happens in either $T_2$ or $B_2$, then it must be of type "L", and thus it is not to be changed. Rule (5) specifies the basic constraint for converting a page of type "S" to "L". In particular, if a history page in $B_1$ gets a hit, then its type is changed to "L". Whenever there is a hit on page in $B_1$, then it is known that its previous hit was at least as large as the size of the list $T_1$, and, hence, it is guaranteed that the hit page is of long-term utility and not just of short-term utility.

When a page is removed from the cache directory, that is, from the set $T_1 \cup B_1 \cup T_2 \cup B_2$, its type is forgotten. The invention decides which list to delete from according to the following rule that depends on the tunable parameter p, $0 \leq p \leq c$. The parameter p roughly corresponds to the target size of the list $T_1$. The replacement rule is described in the first subroutine in Example 1. A second parameter q is also maintained, whereby q is the target size for the list $B_1$. The replacement rule for the cache history is described in the second subroutine in Example 1.

EXAMPLE 1

REPLACE(c, p) x-requested page.
If $((|T_1|>p)$ or $(|T_1|=p$ and $x \in B_2)$ or $(T_2$ is empty$))$, then remove the bottom page in $T_1$ from the cache and from the list $T_1$, and place it at the top of $B_1$. $n_S=n_S-1$. Equalize(c, p)
Else remove the bottom page in $T_2$ from the cache and from the list $T_2$, and place it at the top of $B_2$. $n_L=n_L-1$.
Endif
REPLACE2(c, p) x-requested page.
If $((|B_1|>\max\{0,q\})$ or $(B_2$ is empty$))$, then remove the bottom page in $B_1$ from the cache directory.
Else remove the bottom page in $B_2$ from the cache directory.
Endif The subroutine REPLACE(c, p) encodes the cache replacement technique of the invention. The subroutine REPLACE(c, p) indicates that if the size of the list $T_1$ is larger than its target p, then the LRU page is removed from the bottom of $T_1$, otherwise the LRU page is removed from the bottom of $T_2$. If a page from $T_1$ is removed, then a page of short-term utility is lost, and, hence, the counter $n_S$ is decremented by one. Similarly, if a page from $T_2$ is removed, then a page of short-term utility is lost, and, hence, the counter $n_L$ is decremented by one.

The subroutine REPLACE2(c, p) encodes the cache history replacement technique of the invention. The subroutine REPLACE2(c, p) indicates that if the size of the list $B_1$ is larger than its target q, then the LRU page is removed from the bottom of $B_1$, otherwise the LRU page is removed from the bottom of $B_2$.

Example 1 shows that the first replacement rule decides whether to delete the bottom page of $T_1$ or the bottom page of $T_2$. A cache replacement is only made if the cache is full, that is if $|T_1|+|T_2|=c$, and a totally new page that is not in $T_1 \cup B_1 \cup T_2 \cup B_2$ is requested. The second replacement rule decides whether to delete the bottom page of $B_1$ or the bottom page of $B_2$. A cache history replacement is only made if the cache history is full, that is if $|B_1|+|B_2|=c$, and a totally new page that is not in $T_1 \cup B_1 \cup T_2 \cup B_2$ is requested.

Also, because the invention provides that a page at the bottom of $T_1$ must be of type "S", the invention utilizes a stack transfer operation that maintains this invariant. This operation is described in Example 2. Every time that a page is deleted from the bottom of $T_1$, the invention runs the Equalize operation to ensure that the bottom page in $T_1$ is of type "S". The invention provides: Let $n_S$ and $n_L$, respectively, denote the number of pages in cache that are marked as "S" and "L".

EXAMPLE 2

Equalize(c, p)
while $((|T_1|>0)$ and (the bottom page in $T_1$ has type "L"))
   move the bottom page in $T_1$ to the top of $T_2$, and set $q=\max(q-1, c-|T_1|)$.
endwhile Previously described invariant (12) requires that the LRU page in $T_1$ must be always marked as "S". Now, the list $T_1$ must be allowed to have pages that are marked either as "S" or as "L". However, it is possible that the LRU page in $T_1$ is marked as "L". In this case, to satisfy invariant (12), such pages are removed from the bottom of $T_1$ and moved to the top of $T_2$. Accordingly, the subroutine Equalize(c, p) described in Example 2 accomplishes this task. Moreover, Example 2 shows a page moving rule that attempts to ensure that either $T_1$ is empty or its bottom page is of type "S". This is achieved by moving the pages that are marked as "L" from the bottom of $T_1$ to the top of $T_2$.

More particularly, when the parameter p is set to zero, the invention attempts to keep zero pages in the list $T_1$ and c pages in the list $T_2$, thus emphasizing long-term utility pages in the case and deemphasizing short-term utility pages. Conversely, when the parameter p is set to c, the invention attempts to keep zero pages in the list $T_2$ and c pages in the list $T_1$, thus emphasizing short-term utility pages in the case and deemphasizing long-term utility pages. The fundamental idea behind the invention is that it does not use a fixed value of the parameters, but rather the invention continually tunes the parameter p in response to an observed workload. The invention achieves this dynamic tuning of the parameter p by observing whether cache history hits are observed in the lists $B_1$ or $B_2$. Specifically, if a cache history hit is observed in the list $B_1$, then the parameter p is increased, thus increasing the size of the list $T_1$. Similarly, if a cache history hit is observed in the list $B_2$, then the parameter p is decreased, thus decreasing the size of the list $T_1$.

The overall routine for adaptive replacement cache with temporal filtering according to the invention is described in Example 3.

EXAMPLE 3

ART(c) INITIALIZE $T_1=B_1=T_2=B_2=\emptyset$, p=0, q=c. $n_S=n_L=0$.
x-requested page.

Case I. x $T_1$. Move x to the top of $T_1$. If $(|T_1|\geq|B_1|)$, set type of x to "L", $n_S=n_S-1$, and $n_L=n_L+1$. Equalize(c, p).

Case II. x $T_2$. Move x to the top of $T_1$. If $|T_2|+|B_2|+|T_1|-n_S\geq c$, set target q=min(q+1, 2c-$|T_1|$).

Case III. x $B_1$. Adapt p=min{c, p+max{$n_S/|B_1|$, 1}}. REPLACE(c, p). Move x to the top of $T_1$, change its type to "L", and place it in the cache. $n_L=n_L+1$.

Case IV. x $B_2$. Adapt p=max{0, p-max{$n_L/|B_2|$, 1}}. REPLACE(c, p). Move x to the top of $T_1$, and place it in the cache. If $|T_2|+|B_2|+|T_1|-n_S\geq c$, then set target q=min (q+1, 2c-$|T_1|$).

Case V. x$\notin T_1 \cup B_1 \cup T_2 \cup B_2$.
  case (i) If $(|T_1|+|T_2|<c)$: do nothing.
  case (ii) If$(|T_1|+|T_2|=c)$: REPLACE(c, p).
    case (a) If$(|B_1|+|B_2|\leq c)$: do nothing.
    case (b) If$(|B_1|+|B_2|=c+1)$: REPLACE2(c,p).
      Put x at the top of $T_1$, set its type to "S", $n_S=n_S+1$, and place it in the cache.

In other words, the above routine provides for the following. Any requested page must be either in the cache lists $T_1$ or $T_2$ or cache history lists $B_1$ or $B_2$, or it may be in neither of these four lists. The invention treats these five cases separately. According to Case I, if the requested page x is in the list $T_1$, then the invention moves the hit page to the MRU position in $T_1$. Also, if the size of $T_1$ is at least as large as the size of the list $B_1$, then the requested page is marked as being of type "L" and the counter $n_L$ is incremented by one.

According to Case II, if the requested page x is in the list $T_2$, then the invention moves the hit page to the MRU position in $T_1$. Because $T_1$ now contains one more page marked as being of type "L", the target for the history list $B_1$, namely, q, is incremented by one. In Case III, if the requested page x is in the history cache list $B_1$, then the invention increases the target p for the list $T_1$. Because the requested page must now be put in the cache, additional space must be made, thus subroutine REPLACE(c, p) is run. The page x is moved to the MRU position in $T_1$ and its type is set to "L". Accordingly, the counter $n_L$ is incremented by one.

According to Case IV, if the requested page x is in the history cache list $B_2$, then the invention decreases the target p for the list $T_1$. Because the requested page must now be put in the cache, additional space must be made, therefore subroutine REPLACE(c, p) is run. The page x is moved to the MRU position in $T_1$. Because $T_1$ now contains one more page marked as being of type "L", the target for the history list $B_1$, namely, q, is incremented by one. Finally, according to Case V, if the requested page x is not in $T_1$, $T_2$, $B_1$, nor $B_2$, then a totally new page is encountered. If the cache is full, then subroutine REPLACE(c, p) is run. If the cache history is full, then the subroutine REPLACE2(c, p) is run. The new page is marked as being of type "S" and placed at the MRU position in $T_1$. Because $T_1$ now contains one more page marked as being of type "S", the counter $n_S$ is incremented by one.

Figure 2:
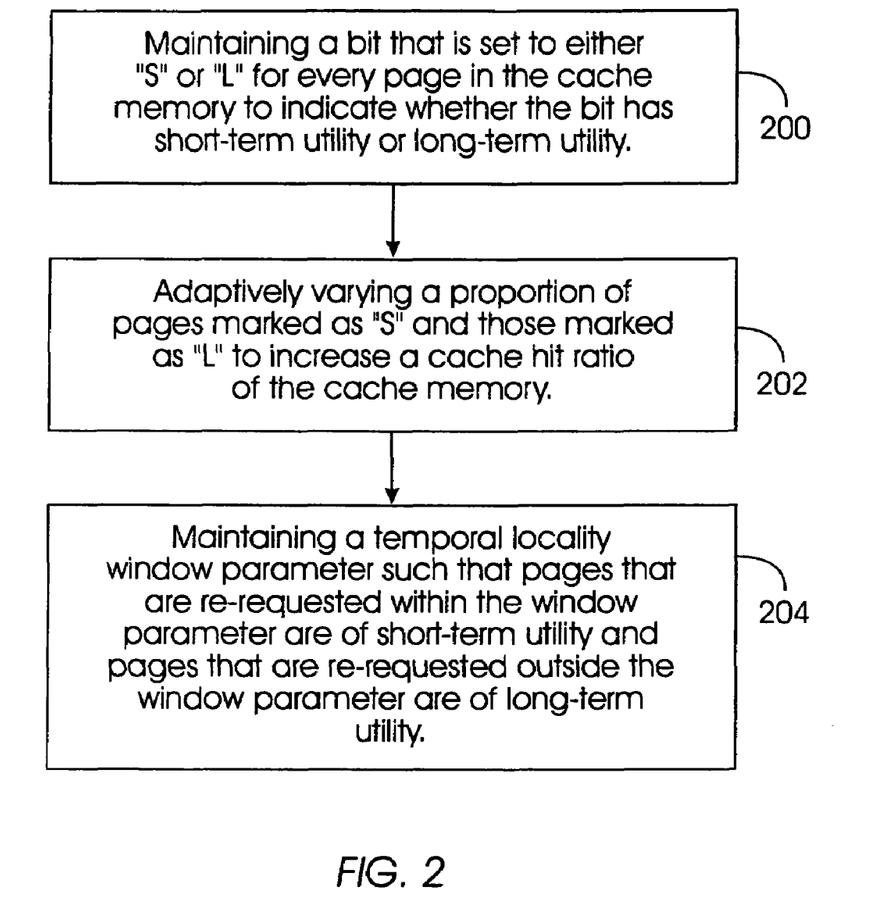
FIG. 2 is a flow diagram illustrating a preferred method of the invention.

A flowchart illustrating the method of the invention is illustrated in FIG. 2, wherein the method of adaptively managing pages in a cache memory with a variable workload comprises maintaining 200 a bit that is set to either "S" (first identifier) or "L" (second identifier) for every page in the cache memory to indicate whether the bit has short-term utility or long-term utility; and adaptively varying 202 a proportion of pages marked as "S" and those marked as "L" to increase a cache hit ratio of the cache memory. The method further comprises maintaining 204 a temporal locality window such that pages that are re-requested within the window are of short-term utility and pages that are re-requested outside the window are of long-term utility.

Figure 3:
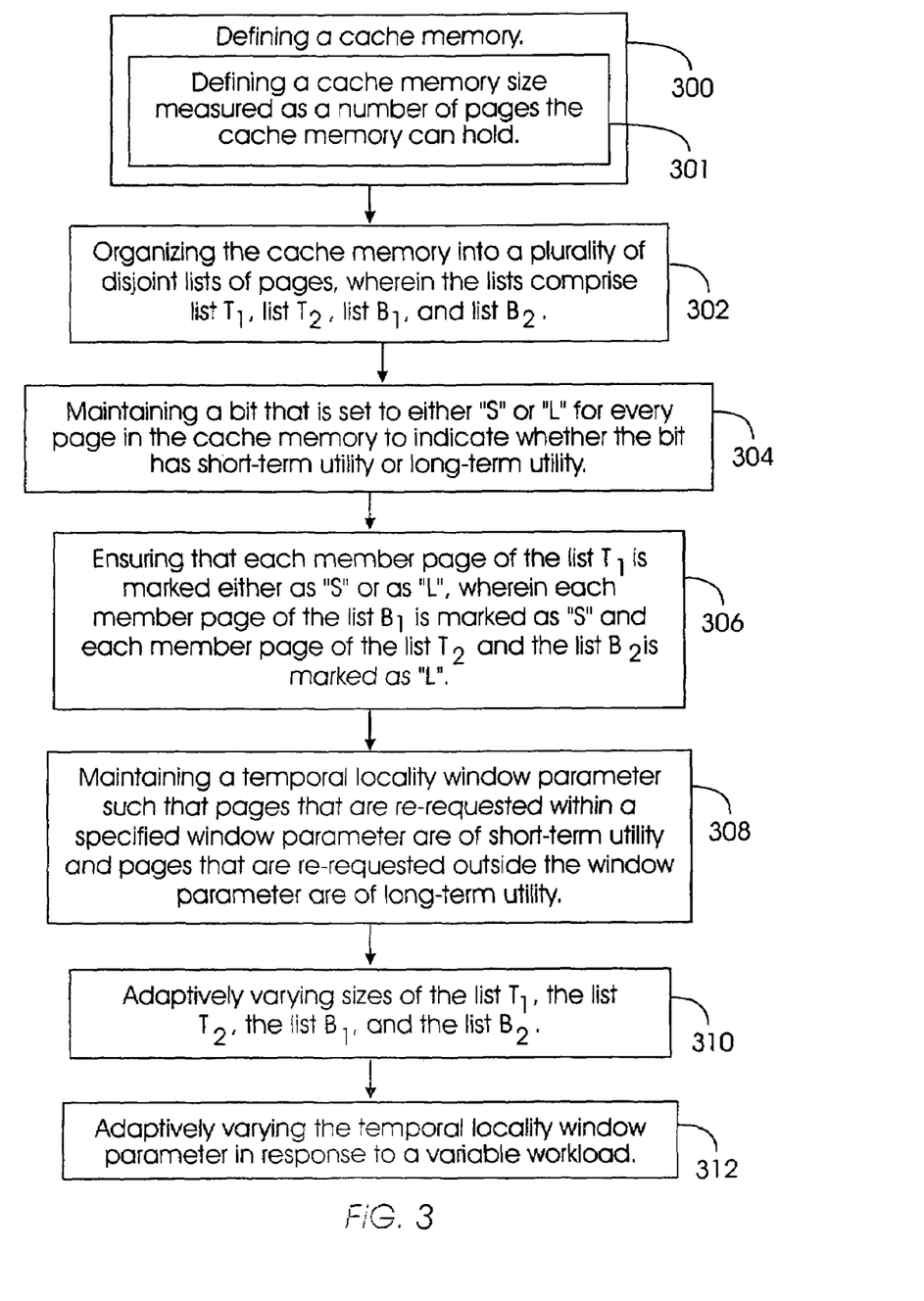
FIG. 3 is a flow diagram illustrating a preferred method of the invention.
Figure 4:
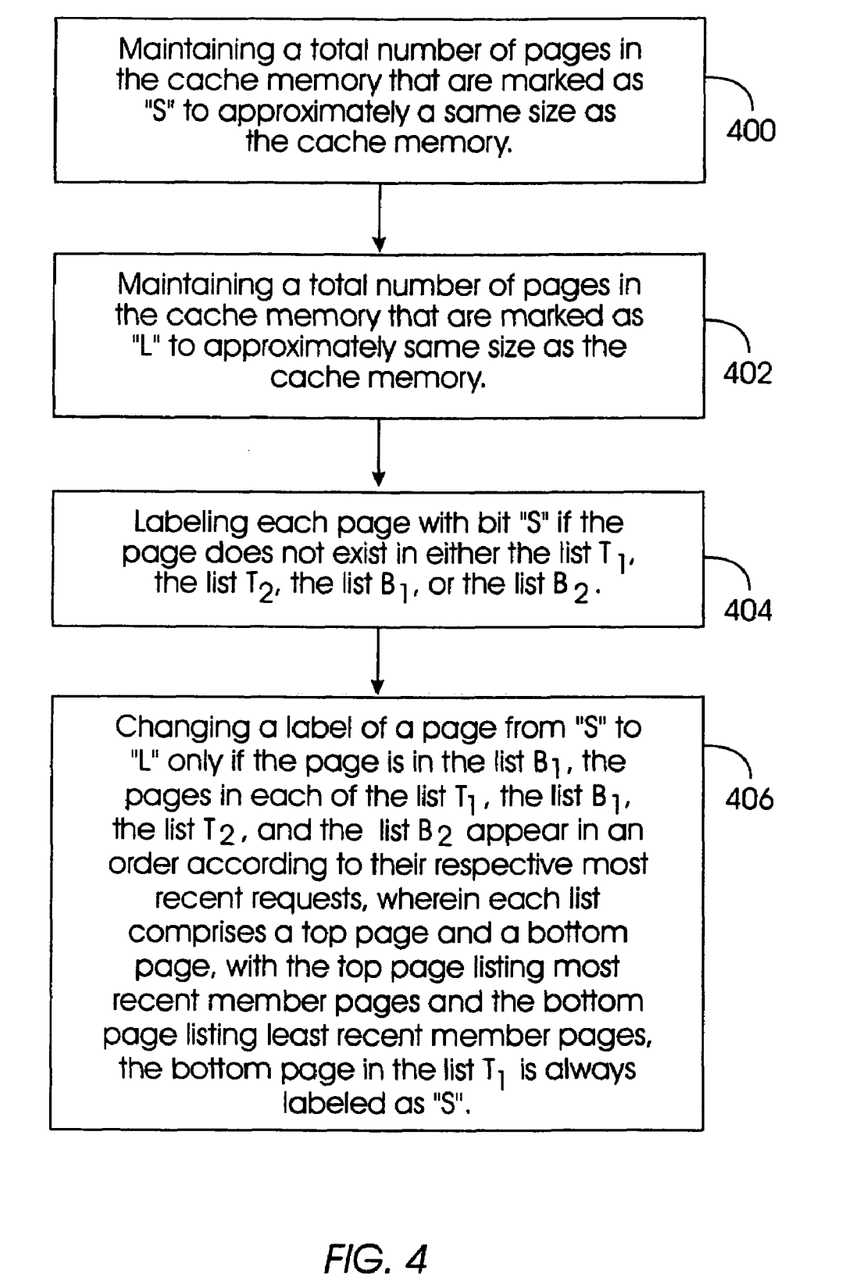
FIG. 4 is a flow diagram illustrating a preferred method of the invention.

Alternatively, as illustrated in the flowchart in FIG. 3 the invention provides a method of adaptively managing pages in a cache memory with a variable workload comprising defining 300 a cache memory; organizing 302 the cache memory into a plurality of disjoint lists of pages, wherein the lists comprise list $T_1$, list $T_2$, list $B_1$, and list $B_2$ (first list of top pages, second list of top pages, first list of bottom pages, and second list of bottom pages respectively); maintaining 304 a bit that is set to either "S" or "L" for every page in the cache memory to indicate whether the bit has short-term utility or long-term utility; ensuring 306 that each member page of the list $T_1$ is marked either as "S" or as "L", wherein each member page of the list $B_1$ is marked as "S" and each member page of the list $T_2$ and the list $B_2$ is marked as "L"; and maintaining 308 a temporal locality window parameter, p, such that pages that are re-requested within a specified window are of short-term utility and pages that are re-requested outside the window are of long-term utility, wherein the cache memory comprises pages that are members of any of the list $T_1$ and the list $T_2$, and the cache history comprises pages that are members of any of the list $B_1$ and $B_2$. The method further comprises adaptively varying 310 sizes of the list $T_1$, the list $T_2$, the list $B_1$, and the list $B_2$, and adaptively varying 312 the temporal locality window parameter, p, in response to a variable workload.

The list $T_1$ and the list $B_1$ have a variable total length, and the list $T_2$ and the list $B_2$ have a variable total length. Moreover, the step 300 of defining the cache memory comprises defining 301 a cache memory size measured as a number of pages the cache memory can hold. Also, as shown in the flow diagram of FIG. 4 the method further comprises maintaining 400 a total number of pages in the cache memory that are marked as "S" to approximately a same size as the cache memory, maintaining 402 a total number of pages in the cache memory that are marked as "L" to approximately a same size as the cache memory, labeling 404 each page with bit "S" if the page does not exist in either the list $T_1$, the list $T_2$, the list $B_1$, or the list $B_2$, and changing 406 a label of a page from "S" to "L" only if the page is in the list $B_1$, the pages in each of the list $T_1$, the list $B_1$, the list $T_2$, and the list $B_2$ appear in an order according to their respective most recent requests, wherein each list comprises a top page and a bottom page, with the top page listing most recent member pages and the bottom page listing least recent member pages, the bottom page in the list $T_1$ is always labeled as "S".

Figure 5:
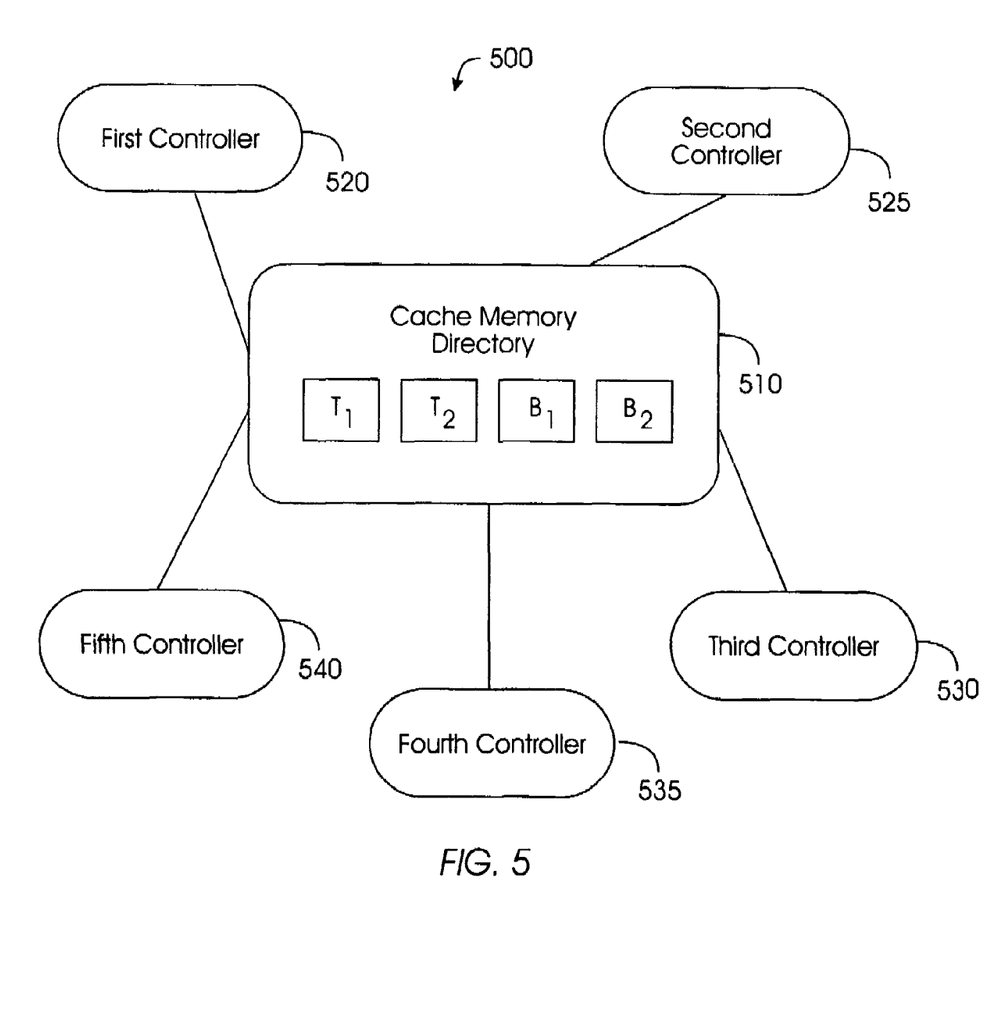
FIG. 5 is a block diagram according to the invention.

Another embodiment of the invention illustrated in FIG. 5 provides a computer system 500 for adaptively managing pages in a cache memory with a variable workload comprising a cache memory directory 510 comprising a plurality of disjoint lists 512 of pages, wherein the lists comprise lists $T_1$, $T_2$, $B_1$, and $B_2$ (first list of top pages, second list of top pages, first list of bottom pages, and second list of bottom pages respectively); a bit marker 515 that marks each of the pages to either "S" (first identifier) or "L" (second identifier) in the cache memory directory 510 to indicate whether the page has short-term utility or long-term utility, wherein each member page of the list $T_1$ is marked either as "S" or as "L", wherein each member page of the list $B_1$ is marked as "S", and wherein each member page of the list $T_2$ and the list $B_2$ is marked as "L"; and a temporal locality window parameter, p, wherein pages that are re-requested within a specified window parameter, p, are of short-term utility and pages that are re-requested outside the window parameter, p, are of long-term utility, wherein the cache memory directory 510 comprises pages that are members of any of the lists $T_1$ and $T_2$, and the cache history comprises pages that are members of any of the list $B_1$ and $B_2$.

The computer system 500 further comprises a first controller 520 operable for adaptively varying sizes of the list $T_1$, the list $T_2$, the list $B_1$, and the list $B_2$, and adaptively varying the temporal locality window parameter, p, in response to a variable workload, wherein the list $T_1$ and the list $B_1$ have a variable total length, and the list $T_2$ and the list $B_2$ have a variable total length, and wherein the cache memory directory 510 comprises a cache memory directory size measured as a number of pages the cache memory directory 510 can hold. The computer system 500 further comprises a second controller 525 operable for maintaining a total number of pages in the cache memory directory 510 that are marked as "S" to approximately a same size as the cache memory directory 510. Also, the computer system 500 further comprises a third controller 530 operable for maintaining a total number of pages in the cache memory directory 510 that are marked "L" to approximately a same size as the cache memory directory.

Additionally, the computer system 500 further comprises a fourth controller 535 operable for labeling each page with bit "S" if the page does not exist in either the list $T_1$, the list $T_2$, the list $B_1$, or the list $B_2$. Furthermore, the computer system 500 further comprises a fifth controller 540 operable for changing a label of a page from "S" to "L" only if the page is in the list $B_1$, wherein the pages in each of the lists $T_1$, $B_1$, $T_2$, and $B_2$ appear in an order according to their respective most recent requests, wherein each list comprises a top page and a bottom page, with the top page listing most recent member pages and the bottom page listing least recent member pages, the bottom page in the list $T_1$ is always labeled as "S".

The manipulation of the target size q for the list $B_1$ is not provided in the conventional ARC technique. Rather, this manipulation is only provided by the invention. The invention accomplishes this by implementing Cases II and IV as described in Example 3 above. Moreover, the invention is advantageous over all aspects of the conventional ARC technique. For example, the invention is self-tuning, empirically universal with respect to a fixed replacement technique obtained by fixing p, scan-resistant, and low overhead. The invention also significantly outperforms LRU. Moreover, the invention factors out temporal locality, which is a feature that is missing in the conventional ARC technique. As a result, the invention does not pollute the pages in $T_2$ and $B_2$ with pages that may not have long-term utility.

TABLE 1

| Workload | Space(MB) | LRU | ARC | ART |
|---|---|---|---|---|
| P1 | 16 | 16.55 | 28.26 | 28.83 |
| P2 | 16 | 18.47 | 27.38 | 29.22 |
| P3 | 16 | 3.57 | 17.12 | 17.49 |
| P4 | 16 | 5.24 | 11.24 | 11.09 |
| P5 | 16 | 6.73 | 14.27 | 16.33 |

TABLE 1-continued

| Workload | Space(MB) | LRU | ARC | ART |
|---|---|---|---|---|
| P6 | 16 | 4.24 | 23.84 | 24.05 |
| P7 | 16 | 3.45 | 13.77 | 14.25 |
| P8 | 16 | 17.18 | 27.51 | 28.04 |
| P9 | 16 | 8.28 | 19.73 | 22.61 |
| P10 | 16 | 2.48 | 9.46 | 9.60 |
| P11 | 16 | 20.92 | 26.48 | 27.31 |
| P12 | 16 | 8.93 | 15.94 | 17.09 |
| P13 | 16 | 7.83 | 16.60 | 17.29 |
| P14 | 16 | 15.73 | 20.52 | 21.13 |
| DS1 | 1024 | 11.65 | 22.52 | 24.63 |
| SPC1 | 4096 | 9.19 | 20.00 | 21.60 |
| Merge(S) | 4096 | 27.62 | 40.44 | 41.04 |

Table 1 illustrates a comparison of the conventional LRU and ARC techniques versus the invention (ART) for various workloads. It can be seen that ARC and ART outperform LRU, sometimes quite dramatically. It can be seen that except for one workload, ART outperforms ARC. The column "Workload" summarizes various traces that were used to measure and quantify the benefits of the invention. These traces capture disk accesses by databases, web servers, NT workstations, and a synthetic benchmark for storage controllers. All traces are representative of workloads seen by storage controllers, disks, or RAID controllers. The traces P1–P14 are collected from workstations running Windows NT by using Vtrace, which captures disk operations through the use of device filters. Experimentally, the traces were gathered over several months. The page size for these traces is 512 bytes. The trace DS1 is removed from a database server running at a commercial site running an ERP application on top of a commercial database. Moreover, the trace is seven days long. SPC1 is a synthetic benchmark trace that contains long sequential scans in addition to random accesses. The page size for this trace is 4 KB. The trace Merge(S) is obtained by merging three traces S1, S2, and S3 using time stamps on each of the requests, where the three traces S1, S2, and S3 are disk read accesses initiated by a large commercial search engine in response to various web search requests. The trace S1 is captured over a period of an hour, S2 is captured over approximately four hours, and S3 is captured over approximately six hours. The page size for these traces is 4 KB.

A cache replacement technique is often measured by its hit ratio, which is the fraction of the requests that are found in the cache. The columns LRU, ARC, and ART represent hit-ratios that are reported in percentages, where a higher hit-ratio is better than a lower hit-ratio. Table 1 clearly shows that the invention, ART, has a hit ratio that is better than LRU, and sometimes dramatically better. The table also shows that on most traces ART has a hit ratio better than ARC.

Figure 6:
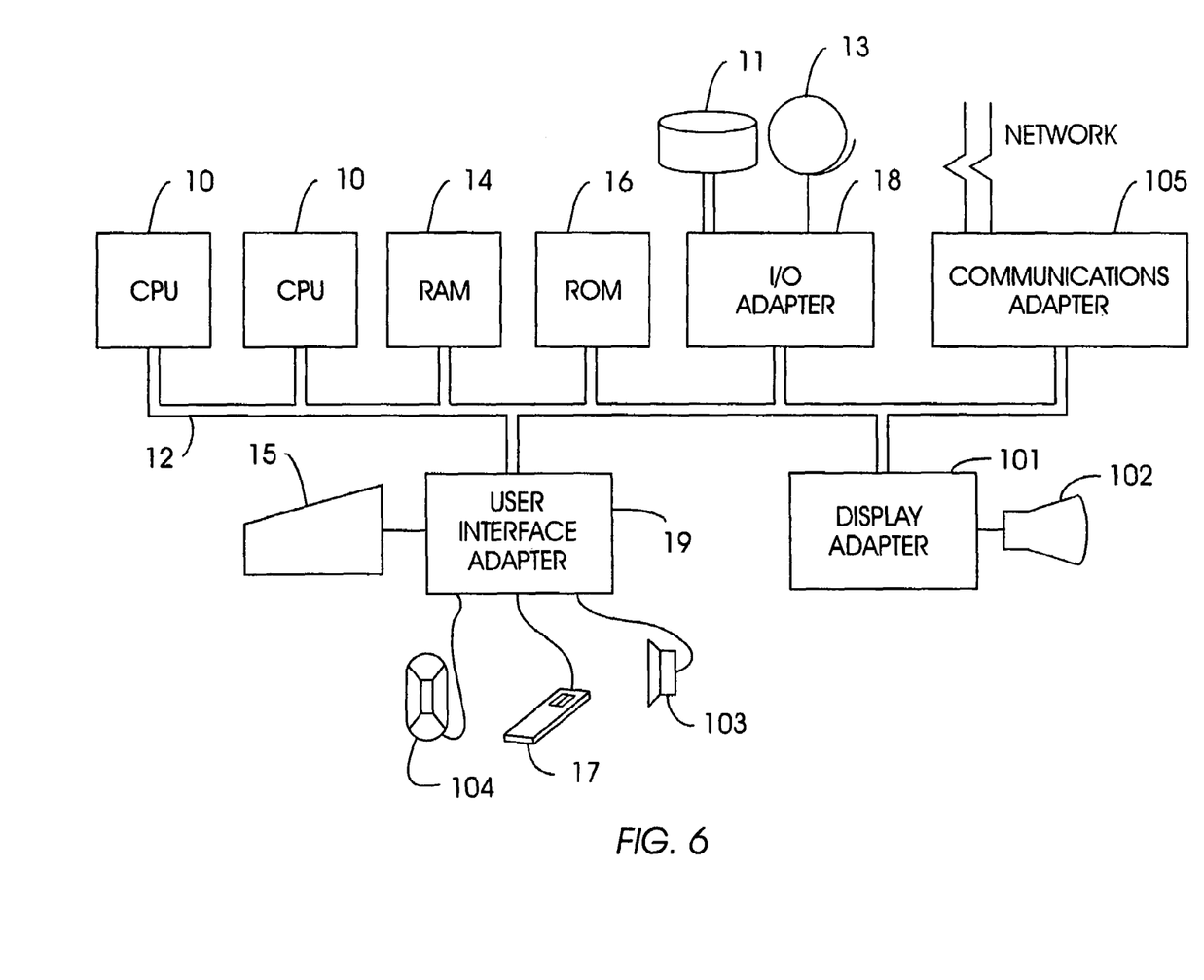
FIG. 6 is a systems diagram according to the invention.

A representative hardware environment for practicing the present invention is depicted in FIG. 6, which illustrates a typical hardware configuration of an information handling/computer system in accordance with the present invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system.

Essentially, the invention is an improvement to the adaptive replacement cache (ARC) technique for upper levels of memory hierarchy, especially databases, virtual memory, and file systems. The invention acts as a temporal filter to distill pages with long-term utility from those with only short-term utility. The invention accomplishes this by (1) maintaining a bit that is set to either a first identifier or a second identifier for every page in the cache memory to indicate whether the bit has short-term utility or long-term utility, and (2) adaptively varying a proportion of pages marked as short-term utility and those marked as long-term utility to increase the cache hit ratio of the cache memory.

While the invention has been described in terms of preferred embodiments, those skilled in the art will recognize that the invention can be practiced with modification within the spirit and scope of the appended claims.

What is claimed is:

1. A method of adaptively managing pages in a cache memory with a variable workload, said method comprising:
   maintaining a bit that is set to either a first identifier or a second identifier for every page in the cache memory to indicate whether the bit has short-term utility or long-term utility; and
   adaptively varying a proportion of pages marked as said short-term utility and those marked as said long-term utility to increase a cache hit ratio of said cache memory.

2. The method claim 1, further comprising maintaining a temporal locality window such that pages that are re-requested within the window are of short-term utility and pages that are re-requested outside the window are of long-term utility.

3. A method of adaptively managing pages in a cache memory with a variable workload, said method comprising:
   defining a cache memory;
   organizing the cache memory into a plurality of disjoint lists of pages, wherein said lists comprise first list of top pages, the first list of bottom pages, the second list of top pages, and the second list of bottom pages;
   maintaining a bit that is set to either a first identifier or a second identifier for every page in the cache memory to indicate whether the bit has short-term utility or long-term utility;
   ensuring that each member page of the first list of top pages is marked either as short-term utility or as long-term utility, wherein each member page of said first list of bottom pages is marked as short-term utility and each member page of said second list of top pages and said second list of bottom pages is marked as long-term utility; and
   maintaining a temporal locality window parameter such that pages that are re-requested within a specified window are of short-term utility and pages that are re-requested outside the window are of long-term utility, wherein the cache memory comprises pages that are members of any of said first list of top pages and said second list of top pages.

4. The method of claim 3, further comprising adaptively varying sizes of said first list of top pages, said second list of top pages, said first list of bottom pages, and said second list of bottom pages, and adaptively varying the temporal locality window parameter in response to a variable workload.

5. The method of claim 3, wherein said first list of top pages and said first list of bottom pages have a variable total length, and said second list of top pages and said second list of bottom pages have a variable total length.

6. The method of claim 3, wherein said step of defining the cache memory comprises defining a cache memory size measured as a number of pages the cache memory can hold.

7. The method of claim 6, further comprising maintaining a total number of pages in the cache memory that are marked as short-term utility to approximately a same size as the cache memory.

8. The method of claim 6, further comprising maintaining a total number of pages in the cache memory that are marked as long-term utility to approximately a same size as the cache memory.

9. The method of claim 3, further comprising labeling each page with bit short-term utility if said page does not exist in either said first list of top pages, said second list of top pages, said first list of bottom pages, or said second list of bottom pages.

10. The method of claim 3, further comprising changing a label of a page from short-term utility to long-term utility only if said page is in said first list of bottom pages.

11. The method of claim 3, wherein said pages in each of said first list of top pages, said first list of bottom pages, said second list of top pages, and said second list of bottom pages appear in an order according to their respective most recent requests, wherein each list comprises a top page and a bottom page, with said top page listing most recent member pages and said bottom page listing least recent member pages, said bottom page in said first list of top pages is always labeled as short-term utility.

12. A program storage device readable by computer, tangibly embodying a program of instructions executable by said computer to perform a method of adaptively managing pages in a cache memory with a variable workload, said method comprising:
   defining a cache memory;
   organizing the cache memory into a plurality of disjoint lists of pages, wherein said lists comprise first list of top pages, the first list of bottom pages, the second list of top pages, and the second list of bottom pages;
   maintaining a bit that is set to either a first identifier or a second identifier for every page in the cache memory to indicate whether the bit has short-term utility or long-term utility;
   ensuring that each member page of the first list of top pages is marked either as short-term utility or as long-term utility, wherein each member page of said first list of bottom pages is marked as short-term utility and each member page of said second list of top pages and said second list of bottom pages is marked as long-term utility; and
   maintaining a temporal locality window parameter such that pages that are re-requested within a specified window are of short-term utility and pages that are re-requested outside the window are of long-term utility, wherein the cache memory comprises pages that are members of any of said first list of top pages and said second list of top pages.

13. The program storage device of claim 12, further comprising adaptively varying sizes of said first list of top pages, said second list of top pages, said first list of bottom pages, and said second list of bottom pages, and adaptively varying the temporal locality window parameter in response to a variable workload.

14. The program storage device of claim 12, wherein said first list of top pages and said first list of bottom pages have a variable total length, and said second list of top pages and said second list of bottom pages have a variable total length.

15. The program storage device of claim 12, wherein said step of defining the cache memory comprises defining a cache memory size measured as a number of pages the cache memory can hold.

16. The program storage device of claim 15, further comprising maintaining a total number of pages in the cache memory that are marked as "S" to approximately a same size as the cache memory.

17. The program storage device of claim 15, further comprising maintaining a total number of pages in the cache memory that are marked as long-term utility to approximately a same size as the cache memory.

18. The program storage device of claim 12, further comprising labeling each page with bit short-term utility if said page does not exist in either said first list of top pages, said second list of top pages, said first list of bottom pages, or said second list of bottom pages.

19. The program storage device of claim 12, further comprising changing a label of a page from short-term utility to long-term utility only if said page is in said first list of bottom pages.

20. The program storage device of claim 12, wherein said pages in each of said first list of top pages, said first list of bottom pages, said second list of top pages, and said second list of bottom pages appear in an order according to their respective most recent requests, wherein each list comprises a top page and a bottom page, with said top page listing most recent member pages and said bottom page listing least recent member pages, said bottom page in said first list of top pages is always labeled as short-term utility.

21. A computer system for adaptively managing pages in a cache memory with a variable workload comprising:
   a cache memory directory comprising a plurality of disjoint lists of pages, wherein said lists comprise first list of top pages, second list of top pages, first list of bottom pages, and second list of bottom pages;
   a bit marker that marks each of said pages to either a first identifier or a second identifier in said cache memory directory to indicate whether the page has short-term utility or long-term utility, wherein each member page of said first list of top pages is marked either as short-term utility or as long-term utility, wherein each member page of said first list of bottom pages is marked as short-term utility, and wherein each member page of said second list of top pages and said second list of bottom pages is marked as long-term utility; and
   a temporal locality window parameter, wherein pages that are re-requested within a specified window parameter are of short-term utility and pages that are re-requested outside the window parameter are of long-term utility, wherein said cache memory directory comprises pages that are members of any of said first list of top pages and said second list of top pages.

22. The computer system of claim 21, further comprising a controller operable for adaptively varying sizes of said first list of top pages, said second list of top pages, said first list of bottom pages, and said second list of bottom pages, and adaptively varying the temporal locality window parameter in response to a variable workload.

23. The computer system of claim 21, wherein said first list of top pages and said first list of bottom pages have a variable total length, and said second list of top pages and said second list of bottom pages have a variable total length.

24. The computer system of claim 21, wherein said cache memory directory comprises a cache memory directory size measured as a number of pages the cache memory directory can hold.

25. The computer system of claim 24, further comprising a controller operable for maintaining a total number of pages in the cache memory directory that are marked as "S" to approximately a same size as the cache memory directory.

26. The computer system of claim 24, further comprising a controller operable for maintaining a total number of pages in the cache memory directory that are marked as long-term utility to approximately a same size as the cache memory directory.

27. The computer system of claim 21, further comprising a controller operable for labeling each page with bit short-term utility if said page does not exist in either said first list of top pages, said second list of top pages, said first list of bottom pages, or said second list of bottom pages.

28. The computer system of claim 21, further comprising a controller operable for changing a label of a page from short-term utility to long-term utility only if said page is in said first list of bottom pages.

29. The computer system of claim 21, wherein said pages in each of said first list of top pages, said first list of bottom pages, said second list of top pages, and said second list of bottom pages appear in an order according to their respective most recent requests, wherein each list comprises a top page and a bottom page, with said top page listing most recent member pages and said bottom page listing least recent member pages, said bottom page in said first list of top pages is always labeled as short-term utility.

30. A computer system for adaptively managing pages in a cache memory with a variable workload, said method comprising:
   means for defining a cache memory;
   means for organizing the cache memory into four disjoint lists of pages, wherein said lists comprise first list of top pages, second list of top pages, first list of bottom pages, and second list of bottom pages;
   means for maintaining a bit that is set to either a first identifier or a second identifier for every page in the cache memory to indicate whether the bit has short-term utility or long-term utility;
   means for ensuring that each member page of the first list of top pages is marked either as short-term utility or as long-term utility, wherein each member page of said first list of bottom pages is marked as short-term utility and each member page of said second list of top pages and said second list of bottom pages is marked as long-term utility; and
   means for maintaining a temporal locality window parameter such that pages that are re-requested within a specified window parameter are of short-term utility and pages that are re-requested outside the window parameter are of long-term utility, wherein the cache memory comprises pages that are members of any of said first list of top pages and said second list of top pages.

* * * * *